United States Patent
Lee

(10) Patent No.: US 12,525,221 B2
(45) Date of Patent: Jan. 13, 2026

(54) PREPROCESSING MODEL BUILDING SYSTEM FOR SPEECH RECOGNITION FUNCTION AND PREPROCESSING MODEL BUILDING METHOD THEREFOR

(71) Applicants: Hyundai Motor Company, Seoul (KR); Kia Corporation, Seoul (KR)

(72) Inventor: Yong Hyeok Lee, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 270 days.

(21) Appl. No.: 18/130,794

(22) Filed: Apr. 4, 2023

(65) Prior Publication Data

US 2024/0038217 A1 Feb. 1, 2024

(30) Foreign Application Priority Data

Jul. 28, 2022 (KR) .................. 10-2022-0094052

(51) Int. Cl.
*G10L 15/06* (2013.01)
*G10L 15/01* (2013.01)
(Continued)

(52) U.S. Cl.
CPC ............ *G10L 15/063* (2013.01); *G10L 15/01* (2013.01); *G10L 15/02* (2013.01); *G10L 21/0208* (2013.01); *G10L 2015/0635* (2013.01)

(58) Field of Classification Search
CPC ....... G10L 15/063; G10L 15/01; G10L 15/02; G10L 21/0208; G10L 2015/0635
See application file for complete search history.

(56) References Cited

U.S. PATENT DOCUMENTS 7,366,669 B2    4/2008  Nishitani et al.
2015/0112672 A1* 4/2015 Giacobello ........... H04M 9/082
                                                    704/233
(Continued)

FOREIGN PATENT DOCUMENTS

JP    2002297178 A    10/2002
JP    2004279701 A    10/2004
(Continued)

OTHER PUBLICATIONS

Das, R.K., et al. "Predictions of Subjective Ratings and Spoofing Assessments of Voice Conversion Challenge 2020 Submissions," arXiv preprint arXiv:2009.03554, Sep. 8, 2020, 22 pages.
(Continued)

*Primary Examiner* — Bhavesh M Mehta
*Assistant Examiner* — Eunice Lee
(74) *Attorney, Agent, or Firm* — Slater Matsil, LLP

(57) ABSTRACT

In an embodiment a system includes a training data preparation device configured to obtain a speech recognition rate of speech data for training using a target speech recognition model, a recognition rate prediction model configured to estimate an expected recognition rate of the target speech recognition model for clean speech data in which noise is removed from the speech data for training and a speech preprocessing model configured to preprocess the speech data for training to obtain the clean speech data and to update the speech preprocessing model based on a recognition rate loss corresponding to a difference between the expected recognition rate and a maximum recognition rate.

19 Claims, 8 Drawing Sheets

(51) Int. Cl.
   *G10L 15/02* (2006.01)
   *G10L 21/0208* (2013.01)

(56) References Cited

U.S. PATENT DOCUMENTS

| | | | | |
|---|---|---|---|---|
| 2019/0172157 | A1* | 6/2019 | Keohane | G06N 3/08 |
| 2021/0056954 | A1 | 2/2021 | Karita et al. | |
| 2021/0065681 | A1* | 3/2021 | Soni | G10L 15/063 |
| 2022/0005465 | A1* | 1/2022 | Prabhavalkar | G06N 3/045 |
| 2023/0298593 | A1* | 9/2023 | Ramos | G10L 21/0208 |
| | | | | 704/233 |
| 2023/0335118 | A1* | 10/2023 | Huang | G10L 15/063 |
| 2023/0395068 | A1* | 12/2023 | Do | G10L 15/20 |
| 2024/0005941 | A1* | 1/2024 | Xu | G10L 25/30 |

FOREIGN PATENT DOCUMENTS

| | | | |
|---|---|---|---|
| JP | 2007248730 | A | 9/2007 |
| JP | 2009532743 | A | 9/2009 |
| JP | 2013064951 | A | 4/2013 |

OTHER PUBLICATIONS

Fu, S.W., et al. "MetricGAN: Generative Adversarial Networks Based Black-Box Metric Scores Optimization for Speech Enhancement," International Conference on Machine Learning. PMLR, May 13, 2019, 11 pages.

Fu, S.W., et al. "Quality-Net: An End-to-End Non-intrusive Speech Quality Assessment Model based on BLSTM," arXiv preprint arXiv:1808.05344, Aug. 16, 2016, 5 pages.

Manocha, P., et al. "CDPAM: Contrastive Learning for Perceptual Audio Similarity," ICASSP 2021-2021 IEEE International Conference on Acoustics, Speech and Signal Processing (ICASSP). IEEE, Jun. 6-11, 2021, 5 pages.

Reddy,CKA, et al. "DNSMOS: A Non-Intrusive perceptual objective speech quality metric to evaluate noise suppressors," ICASSP 2021-2021 IEEE International Conference on Acoustics, Speech and Signal Processing (ICASSP). IEEE, Feb. 10, 2021, 5 pages.

* cited by examiner

PREPROCESSING MODEL BUILDING SYSTEM FOR SPEECH RECOGNITION FUNCTION AND PREPROCESSING MODEL BUILDING METHOD THEREFOR

CROSS-REFERENCE TO RELATED APPLICATIONS

This application claims the benefit of Korean Patent Application No. 10-2022-0094052, filed on Jul. 28, 2022, which application is hereby incorporated herein by reference.

TECHNICAL FIELD

The present disclosure relates to a preprocessing model building system for a speech recognition function and a preprocessing model building method, and more particularly, relates to technologies for improving the performance of a preprocessing model.

BACKGROUND

Each of electronic devices which operate under control of a user provides a user interface where the user is able to perform a control operation. The user interface has been developed gradually in the direction of requiring less physical forces of users and controlling the electronic device using an intuitive operation from a manner which directly controls a function and an operation of the electronic device itself.

Recently, there have been an increase in speech recognition-based devices which operate based on a speech recognition function of identifying a voice of the user and performing a specific operation based on the identified voice of the user. Because language expressed by voice is the most natural means of communication for natural people, the speech recognition-based devices are very intuitive and convenient to use.

The speech recognition function proceeds with a preprocessing process of removing noise from a speech signal to increase a speech recognition rate.

The speech recognition model uses a well-known model, whereas it is common that a process of preprocessing a speech signal proceeds independently of a speech recognition model. Thus, even though there is a clean voice for the user who is a natural person to hear as noise is removed in voice recognition, the well-known voice recognition model tends to lower a recognition rate for the clean voice.

SUMMARY

Embodiments solve the above-mentioned problems occurring in the prior art while advantages achieved by the prior art might be maintained. In particular, embodiments provide a speech preprocessing process capable of increasing the speech recognition rate.

Embodiments provide a preprocessing model building system for a speech recognition function to be applied to various speech recognition models and a preprocessing model building method therefor.

Further embodiments provide a preprocessing model building system for a speech recognition function to ensure a higher speech recognition rate and a preprocessing model building method therefor.

According to an embodiment of the present disclosure, a preprocessing model building system for a speech recognition function may include a training data preparation device that obtains a speech recognition rate for speech data for training, using a target speech recognition model, a recognition rate prediction model that estimates an expected recognition rate of the target speech recognition model for clean speech data in which noise is removed from the speech data for training, and a speech preprocessing model configured to preprocesses the speech data for training to obtain the clean speech data and updates the speech preprocessing model, based on a recognition rate loss corresponding to a difference between the expected recognition rate and a maximum recognition rate.

According to an embodiment, the training data preparation device may mix noise and room impulse response information with an utterance correct answer in which there is no noise to generate the speech data for training.

According to an embodiment, the training data preparation device may generate a plurality of pieces of speech data for training, the plurality of pieces of speech data corresponding to a plurality of spaces.

According to an embodiment, the training data preparation device may calculate a difference between a learning result where the target speech recognition model learns the speech data for training and the utterance correct answer to obtain a speech recognition rate for training.

According to an embodiment, the recognition rate prediction model may learn the speech data for training, may calculate an expected speech recognition rate for the target speech recognition model, and may update the recognition rate prediction model based on the speech recognition rate for training for the target speech recognition model.

According to an embodiment, the recognition rate prediction model may calculate a difference between an expected speech recognition rate of the speech data for training and the speech recognition rate for training, the speech recognition rate being obtained using the target speech recognition model, to obtain a recognition rate deviation and may perform an update based on the recognition rate deviation.

According to an embodiment, the recognition rate prediction model may perform the update in the direction of reducing the recognition rate deviation.

According to an embodiment, the speech preprocessing model may learn a speech feature of the speech data for training based on artificial intelligence and may improve the learned speech feature to obtain the clean speech data.

According to an embodiment, the speech preprocessing model may perform an update to increase the expected recognition rate in a subsequent preprocessing process.

According to an embodiment, the speech preprocessing model may perform an update in a state where the update of the recognition rate prediction model does not proceed.

According to another embodiment of the present disclosure, a preprocessing model building method for a speech recognition function may include obtaining a speech recognition rate for speech data for training, using a target speech recognition model, preprocessing the speech data for training using a speech preprocessing model to obtain clean speech data in which noise is removed, estimating an expected recognition rate of the clean speech data, using a recognition rate prediction model, and updating the speech preprocessing model, based on a recognition rate loss corresponding to a difference between the expected recognition rate and a maximum recognition rate.

According to an embodiment, the obtaining of the speech recognition rate, using the target speech recognition model, may include mixing noise and room impulse response information with an utterance correct answer in which there is no noise to generate the speech data for training.

According to an embodiment, the generating of the speech data for training may include generating a plurality of pieces of speech data for training, the plurality of pieces of speech data corresponding to a plurality of spaces.

According to an embodiment, the obtaining of the speech recognition rate, using the target speech recognition model, may include calculating a difference between a learning result where the target speech recognition model learns the speech data for training and the utterance correct answer to obtain a speech recognition rate for training.

According to an embodiment, the preprocessing model building method may further include learning, by the recognition rate prediction model, the speech data for training and calculating, by the recognition rate prediction model, an expected speech recognition rate for the target speech recognition model and updating the recognition rate prediction model, based on the speech recognition rate for training for the target speech recognition model.

According to an embodiment, the updating of the recognition rate prediction model may include calculating a difference between an expected speech recognition rate of the speech data for training and the speech recognition rate for training, the speech recognition rate being obtained using the target speech recognition model, to obtain a recognition rate deviation and backpropagating the recognition rate deviation to the recognition rate prediction model.

According to an embodiment, the updating of the recognition rate prediction model may be performed in the direction of reducing the recognition rate deviation.

According to an embodiment, the preprocessing of the speech data for training using the speech preprocessing model to obtain the clean speech data in which the noise is removed may include learning a speech feature of the speech data for training based on artificial intelligence and improving the learned speech feature.

According to an embodiment, the updating of the speech preprocessing model may proceed to increase the expected recognition rate in a subsequent preprocessing process.

According to an embodiment, the updating of the speech preprocessing model may be performed in a state where the update of the recognition rate prediction model does not proceed.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
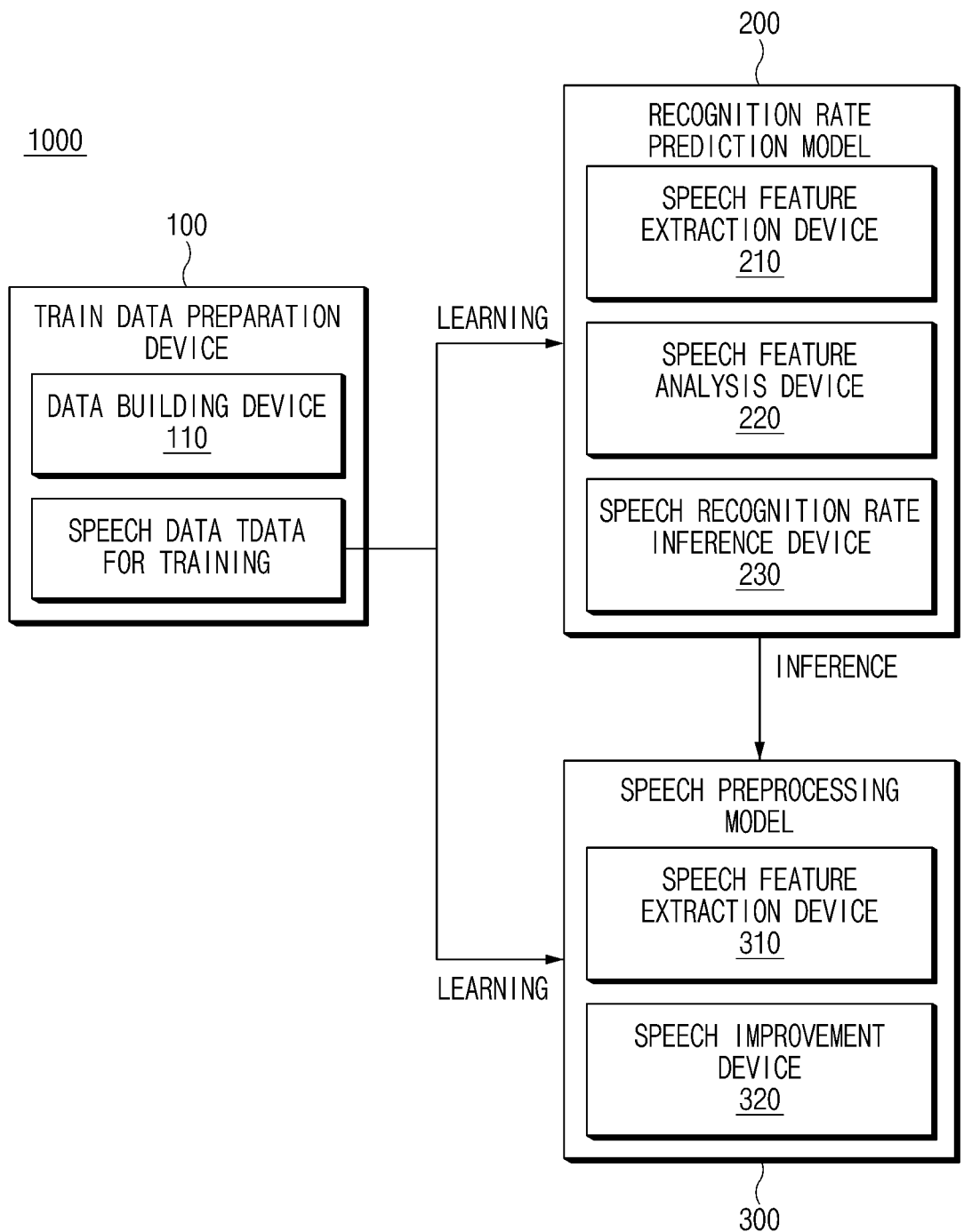
FIG. 1 is a drawing illustrating a configuration of a preprocessing model building system for speech recognition according to an embodiment of the present disclosure.

Hereinafter, some embodiments of the present disclosure will be described in detail with reference to the accompanying drawings. In adding the reference numerals to the components of each drawing, it should be noted that the identical component is designated by the identical numerals even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the corresponding components. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 8.

FIG. 1 is a drawing illustrating a configuration of a preprocessing model building system for speech recognition according to an embodiment of the present disclosure.

Referring to FIG. 1, a preprocessing model building system 1000 according to an embodiment of the present disclosure may include a training data preparation device 100, a recognition rate prediction model 200, and a speech preprocessing model 300. The preprocessing model building system 1000 shown in FIG. 1 may include components for improving the preprocessing performance of the speech preprocessing model 300 which performs a preprocessing process of a speech recognition system.

The training data preparation device 100 may generate speech data TData for training using a data building device 110 and may obtain a speech recognition rate for the speech data TData for training.

The recognition rate prediction model 200 may receive the speech data TData for training, which is generated by the training data preparation device 100, and may perform artificial intelligence (AI) learning, thus inferring an expected speech recognition rate for the speech data TData for training The recognition rate prediction model 200 may be updated to increase an expected speech recognition rate, based on a difference between the expected speech recognition rate for the speech data TData for training and a speech recognition rate for the speech data TData for training.

Furthermore, the recognition rate prediction model 200 may receive clean speech data output by the speech preprocessing model 300 to perform AI learning, thus inferring an expected speech recognition rate for the clean speech data. The recognition rate prediction model 200 may provide the speech preprocessing model 300 with the expected speech recognition rate for the clean speech data. The expected speech recognition rate for the clean speech data may be used in a process of updating the speech preprocessing model 300.

To this end, the recognition rate prediction model 200 may include a first speech feature extraction device 210, a speech feature analysis device 220, and a speech recognition rate inference device 230. Detailed operations of the first speech feature extraction device 210, the speech feature analysis device 220, and the speech recognition rate inference device 230 will be described below.

The speech preprocessing model 300 may separate an additional noise signal from an acoustic signal received in a non-PTT scheme from the outside to divide a speech interval uttered by a speaker.

The speech preprocessing model 300 may preprocess the speech data TData for training, which is output by the train data preparation device 100, to obtain clean speech data.

The speech preprocessing model 300 may receive the expected speech recognition rate for the clean speech data from the recognition rate prediction model 200 and may proceed with an update based on the expected speech recognition rate for the clean speech data. The speech preprocessing model 300 may determine a difference between the expected speech recognition rate for the clean speech data and a maximum speech recognition rate as a recognition rate loss and may proceed with an update in the direction of reducing the recognition rate loss.

To this end, the speech preprocessing model 300 may include a second speech feature extraction device 310 and a speech improvement device 320. Detailed operations of the second speech feature extraction device 310 and the speech improvement device 320 will be described below.

Each of the recognition rate prediction model 200 and the speech preprocessing model 300 may be stored in a memory (not shown) for AI processing. The memory may be a computer readable storage medium configured to work together with a processor, a server or the cloud. The memory may be at least one of a hard disk drive, a flash memory, an electrically erasable programmable read-only memory (EEPROM), a static random access memory (SRAM), a ferroelectric RAM (FRAM), a phase-change RAM (PRAM), a magnetic RAM (MRAM), a dynamic RAM (DRAM), a synchronous DRAM (SDRAM), or a double date rate-SDRAM (DDR-SDRAM) or a combination thereof.

The models 200, 300 included in the memory may learn via a neural network. The neural network for speech recognition may include a plurality of network nodes having weights, which may be designed to simulate a human brain structure on the computer and may simulate neurons of the human neural network. The plurality of network nodes may transmit and receive data depending on each connection relationship to simulate the synaptic activity of neurons which transmit and receive signals through the synapse. The neural network may include a deep learning model developed from a neural network model. The plurality of network nodes in the deep learning model may be located on different layers to transmit and receive data depending on a convolution connection relationship. An example of the deep learning model may include various deep learning techniques such as deep neural networks (DNN), convolutional deep neural networks (CNN), a recurrent Boltzmann machine (RNN), a restricted Boltzmann machine (RBM), deep belief networks (DBN), and a deep Q-network.

The speech recognition system including the speech preprocessing model 300 may be loaded into a vehicle or an electronic device. The electronic device may be a smartphone, a tablet personal computer (PC), a PC, a smart TV, a mobile phone, a personal digital assistant (PDA), a laptop, a media player, a server, a micro-server, a global positioning system (GPS) device, an e-book terminal, a digital broadcasting terminal, navigation, a kiosk, an MP3 player, a digital camera, a speaker, or another mobile or non-mobile computing device.

The train data preparation device 100 and the recognition rate prediction model 200 may be components included in the speech recognition system or components separated from the speech recognition system. For example, the train data preparation device 100 and the recognition rate prediction model 200 may be implemented as a part of a server independent of the speech recognition system.

The speech preprocessing model 300 may communicate with the train data preparation device 100 and the recognition rate prediction model 200 provided in the server using wireless communication. The speech preprocessing model 300 may transmit and receive a wireless signal with at least one of a base station, an external terminal, or a center on a mobile communication network constructed according to technical standards for mobile communication or a communication scheme (e.g., global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), or the like). The wireless signal may include a voice call signal, a video call signal, or various types of data according to text/multimedia message transmission and reception.

Figure 2:
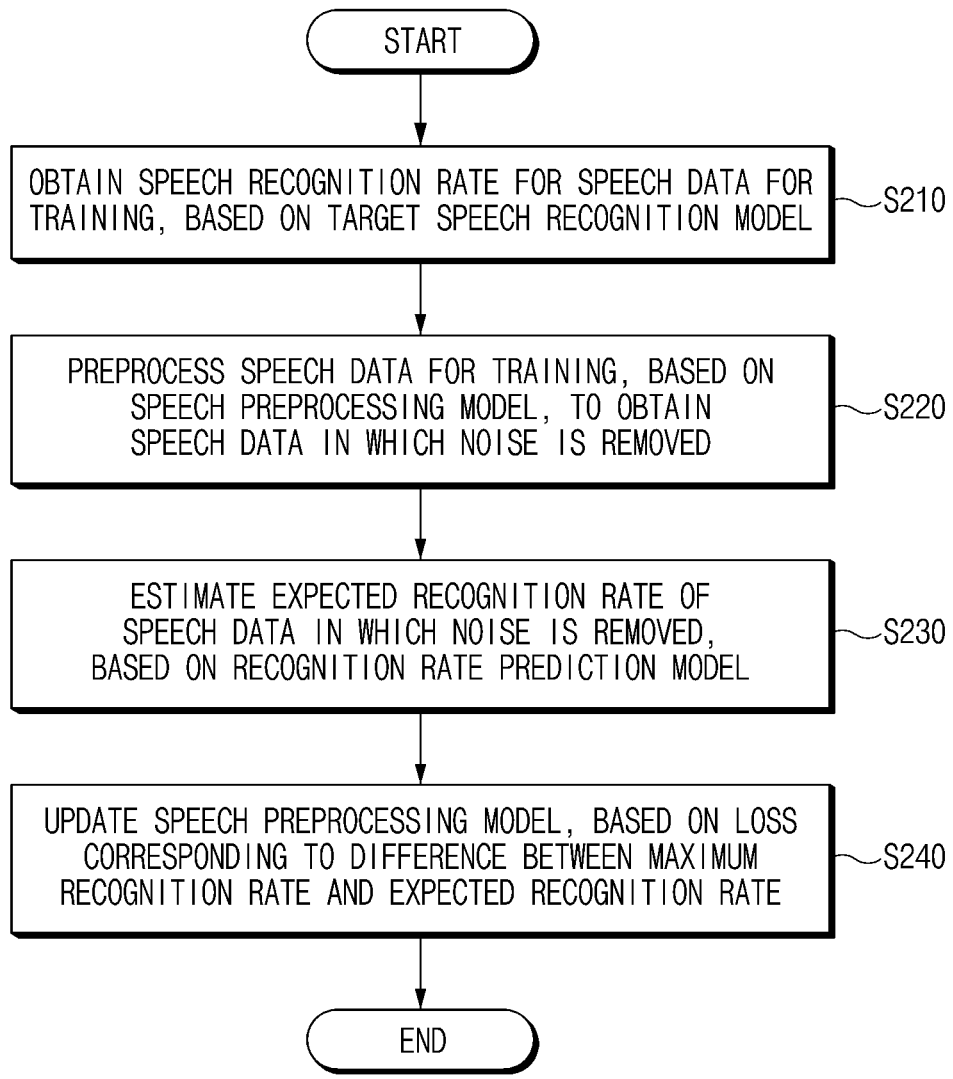
FIG. 2 is a flowchart illustrating a preprocessing model building method according to an embodiment of the present disclosure.

FIG. 2 is a flowchart illustrating a preprocessing model building method according to an embodiment of the present disclosure.

The preprocessing model building method according to an embodiment of the resent disclosure will be described with reference to FIGS. 1 and 2.

In S210, a train data preparation device 100 may obtain a speech recognition rate for speech data for training, using a target speech recognition model.

The target speech recognition model may receive a speech signal and may extract a feature vector from the received speech signal to recognize speech. The target speech recognition model may be a well-known speech recognition model.

The speech data for training may refer to speech data where noise is included in a clean utterance. The speech data for training may be generated based on voices collected in a plurality of spaces to include features of various spaces.

In S220, a speech preprocessing model 300 may preprocess the speech data for training to obtain clean speech data in which noise is removed.

To this end, the speech preprocessing model 300 may include learning a speech feature of the speech data for training based on AI and improving the learned speech feature.

In S230, a recognition rate prediction model 200 may estimate an expected recognition rate of the clean speech data.

In S240, the speech preprocessing model 300 may proceed with an update based on a recognition rate loss corresponding to a difference between the expected recognition rate and a maximum recognition rate.

The maximum recognition rate may refer to a state where the speech preprocessing model 300 perfectly recognizes the clean speech data without an error and may be represented as a value of 100% when converted to a percentage.

The update of the speech preprocessing model 300 may proceed in the direction of increasing the expected recognition rate. Thus, a difference between an expected recognition rate and a maximum recognition rate by subsequent learning of the speech preprocessing model 300 may be reduced.

As described above, the speech preprocessing model 300 according to an embodiment of the present disclosure may follow the result of the recognition rate prediction model 200 to proceed with an update. In other words, according to an embodiment of the present disclosure, the speech preprocessing model 300 may be updated with a tendency to increase a speech recognition rate of a target speech recognition model which learns clean speech data. Thus, according to an embodiment of the present disclosure, even though the noise cancellation level of the clean voice data is simply good, a problem in which the speech recognition rate of the target speech recognition model is reduced may be improved.

Hereinafter, detailed procedures of the process of updating the speech preprocessing model 300 according to an embodiment of the present disclosure will be described in detail.

Figure 3:
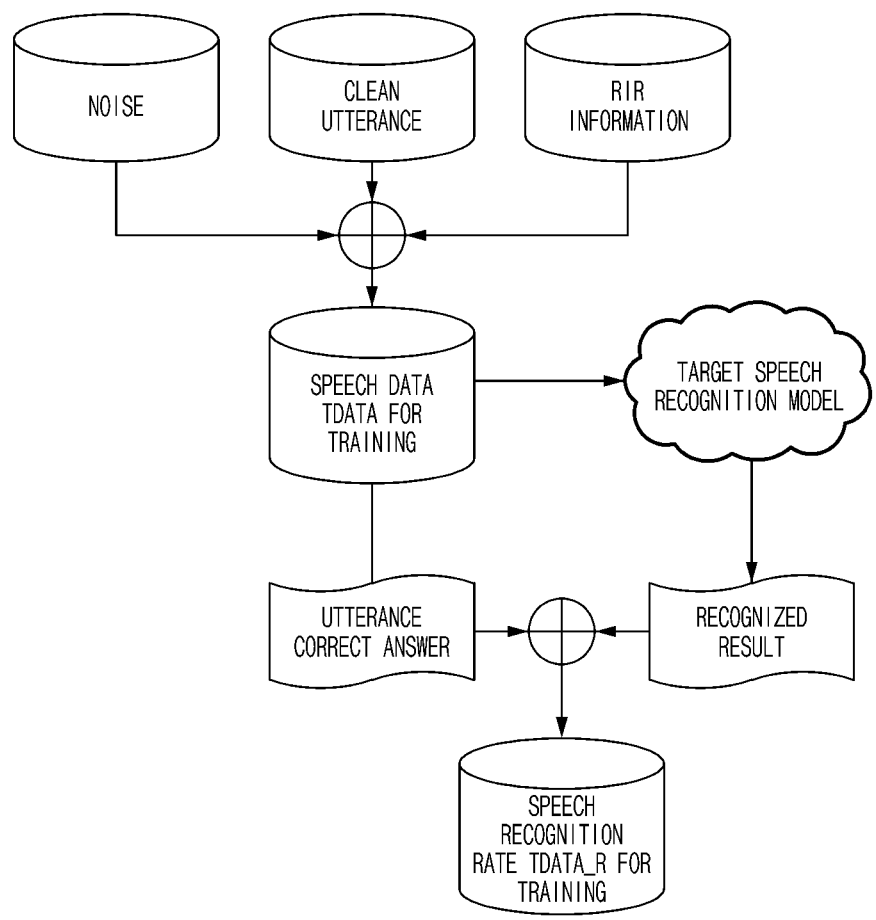
FIG. 3 is a drawing describing a method for obtaining a speech recognition rate of speech data for training according to an embodiment of the present disclosure.
Figure 4:
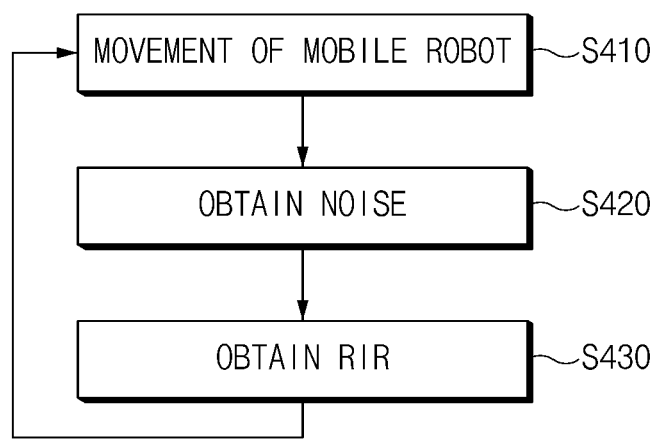
FIGS. 4 and 5 are drawings describing a process of generating speech data for training.
Figure 5:
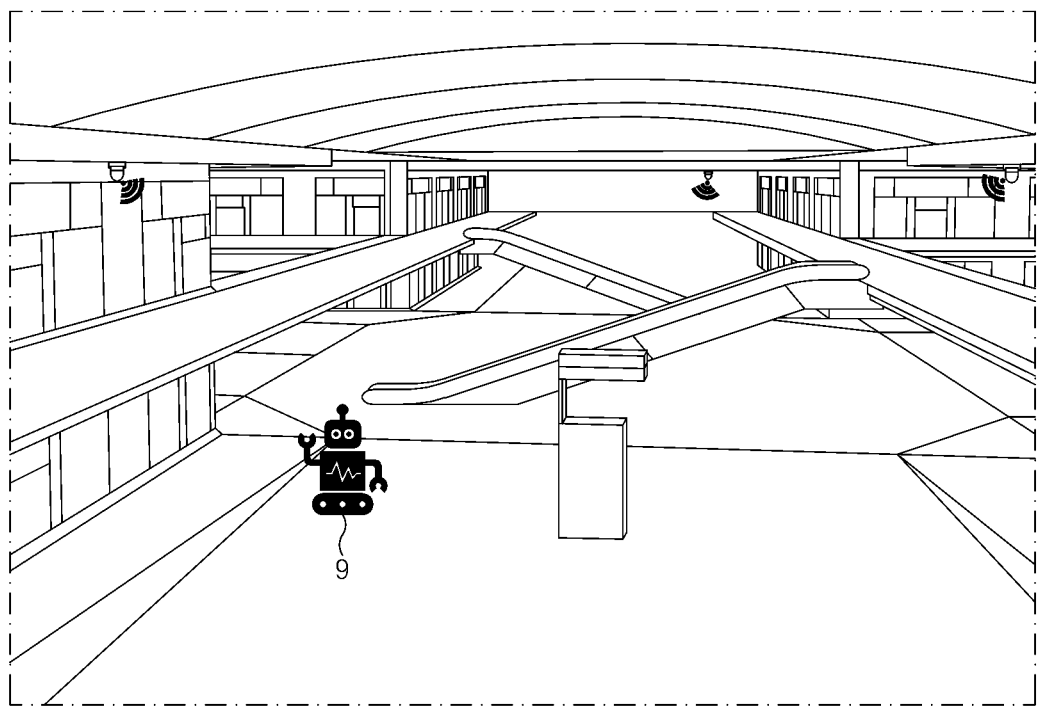
Figure 6:
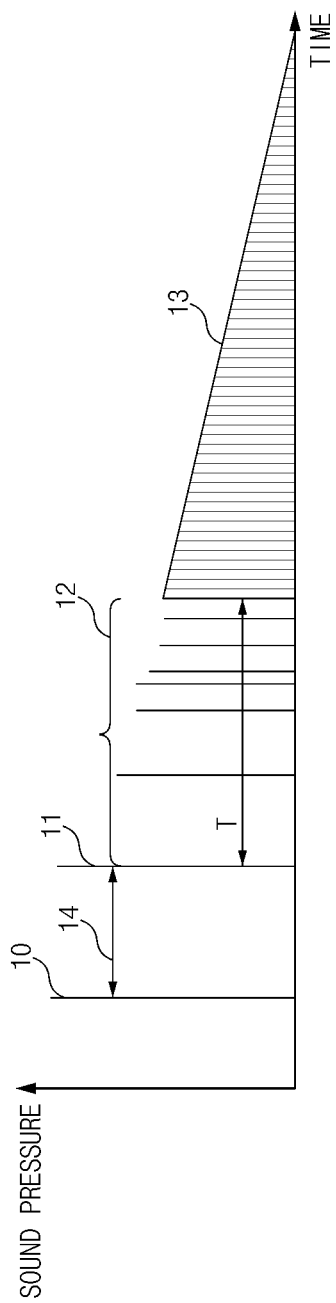
FIG. 6 is a drawing describing room impulse response information.

FIG. 3 is a drawing describing a method for obtaining a speech recognition rate of speech data for training according to an embodiment of the present disclosure. In other words, FIG. 3 illustrates an operation of a train data preparation device. FIGS. 4 and 5 are drawings describing a process of generating speech data for training. FIG. 6 is a drawing describing room impulse response information.

A method for obtaining a speech recognition rate of speech data for training according to an embodiment of the present disclosure will be described with reference to FIGS. 3 to 6.

A train data preparation device 100 of FIG. 1 may mix noise, a clean utterance, and room impulse response (RIR) information to generate speech data TData for training.

The speech data TData for training may be generated based on information obtained from various spaces. To this end, as shown in FIG. 4, in S410, a mobile robot 9 may move along a predetermined path or any path. In S420, the mobile robot 9 may obtain noise whenever located in a specific space. The specific space may be a predetermined space or may be a space where the mobile robot 9 is located per certain time.

Furthermore, in S430, the mobile robot 9 may obtain RIR information whenever located in the specific space.

As shown in FIG. 6, a sound transmitted by a listener from a room impulse sound source 10 may be divided into a direct sound 11, an initial reflected sound 12, and a late reverberation sound 13.

The direct sound 11 may refer to a sound directly delivered from an impulse sound source 10 to the listener. A time when the direct sound 11 is delivered from the impulse sound source 10 to the listener may be defined as an initial delay 14.

The reflected sound may refer to a sound where sounds generated by the impulse sound source 10 are reflected from a reflective surface such as a wall surface or a ceiling and are then delivered to the listener through a path which relatively become longer than the direct sound 11. A reflected sound delivered between about 50 ms and about 80 ms after the direct sound 11 is delivered may be defined as an early reflection sound 12.

Because the early reflection sound 12 is delivered within a fast time after the direct sound 11 is reached, it may enhance the sense of volume by reinforcing the direct sound 11 without changing the sense of direction of the sound and may express the spatial sense of a stereophonic sound well.

The late reverberation sound 13 may be a reflected sound which appears about 80 ms after the direct sound 11 is generated, which may be obtained as reflected sounds delivered through several paths overlap with each other. As a portion of energy is absorbed into a reflective surface when reflected, the magnitude of reverberation 13 may be reduced generally exponentially.

An embodiment shown in FIG. 4 describes that the mobile robot 9 generates speech data TData for training, but a means for generating speech data TData for training is not limited thereto. For example, a collection device (not shown) for obtaining speech data TData for training may be installed per specific space, and the mobile robot 9 may receive the speech data TData for training from the collection device while passing through the specific space.

The train data preparation device 100 may extract an utterance correct answer from the speech data TData for training. The utterance correct answer may be text of a clean utterance. For example, when the speech data TData for training is a clean utterance reading the text "Turn on the navigation", the utterance correct answer may be the text "Turn on the navigation".

A target speech recognition model in FIG. 3 may receive the speech data TData for training and may derive a result in which the speech data TData for training is recognized.

The train data preparation device 100 may obtain a speech recognition rate TData_R for training based on a difference between the utterance correct answer of the speech data TData for training and the result recognized by the target speech recognition model. To obtain the speech recognition rate TData_R for training, the utterance correct answer and the result recognized by the target speech recognition model may be compared on a phoneme-by-phonemic or syllable-by-syllable basis.

For example, when the utterance correct answer is 7 syllables "turn, on, the, na, vi, ga, tion", the result recognized by the target speech recognition model may be 7 syllables "tur, on, the, na, vi, ga, tion". The result recognized by the target speech recognition model may be the result of correctly recognizing 6 syllables except for incorrectly recognizing "turn" as "tur". When recognizing 6 of the 7 syllables as a correct answer, the train data preparation device 100 may calculate a speech recognition rate as 90%.

In such a manner, the train data preparation device 100 may store a plurality of pieces of speech data TData for training and speech recognition rates TData_R for training, which are matched with them, in a memory. Table 1 below is a table representing an example of pieces of speech data TData for training and speech recognition rates TData_R for training, which are matched with them.

TABLE 1

| Speech data for training | Speech recognition rate (%) for training |
| --- | --- |
| TData1 | 90 |
| TData2 | 85 |
| TData3 | 100 |

Pieces of speech data TData1, TData2, and TData3 for training may be obtained from different spaces with respect to the same clean utterance. Alternatively, the pieces of speech data TData1, TData2, and TData3 for training may be obtained from the same space with respect to different clean utterances.

Figure 7:
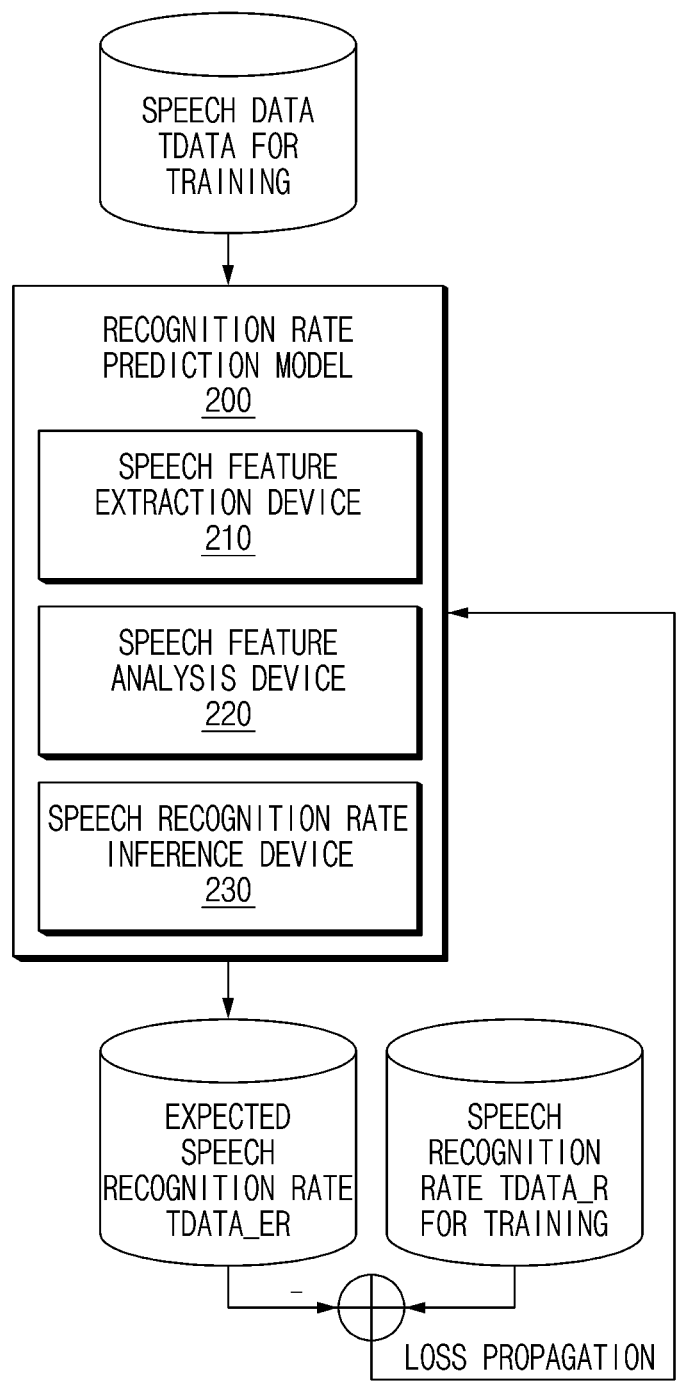
FIG. 7 is a drawing describing a method for updating a recognition rate prediction model.

FIG. 7 is a drawing describing a method for updating a recognition rate prediction model.

Referring to FIG. 7, a recognition rate prediction model 200 according to an embodiment of the present disclosure may receive and learn speech data for training.

To this end, the recognition rate prediction model 200 may include a first speech feature extraction device 210, a speech feature analysis device 220, and a speech recognition rate inference device 230.

The first speech feature extraction device 210 may extract a speech feature from a speech signal. The first speech feature extraction device 210 may extract a speech feature from an acoustic signal based on time energy, frequency energy, or linear predictive coding (LPC). Alternatively, the first speech feature extraction device 210 may extract a speech feature based on a Mel frequency cepstral coefficient (MFCC). Alternatively, the first speech feature extraction device 210 may extract a speech feature using a neural network-based embedding vector.

The speech feature analysis device 220 may analyze the extracted speech feature. The speech feature analysis device 220 may use at least one of a normalization layer, a convolution layer, a recurrent neural network (RNN), or a fully connected layer.

The speech recognition rate inference device 230 may infer a speech recognition rate based on the result analyzed by the speech feature analysis device 220 to obtain an expected speech recognition rate TData_ER.

A preprocessing model building system 1000 of FIG. 1 may calculate a difference between the expected speech recognition rate TData_ER and a speech recognition rate TData_R for training for a target speech recognition model to obtain a recognition rate deviation loss1.

The recognition rate deviation loss1 may be backpropagated to the recognition rate prediction model 200.

The recognition rate prediction model 200 may proceed with an update based on the recognition rate deviation loss1. The update of the recognition rate prediction model 200 may be performed in the direction of minimizing a magnitude of the recognition rate deviation loss1. In other words, the recognition rate prediction model 200 may be updated such that the accuracy of a recognition rate follows a recognition rate of the target speech recognition model.

The procedure of updating the recognition rate prediction model shown in FIG. 7 may be performed in a duration except for a duration when a speech preprocessing model described below is updated.

Figure 8:
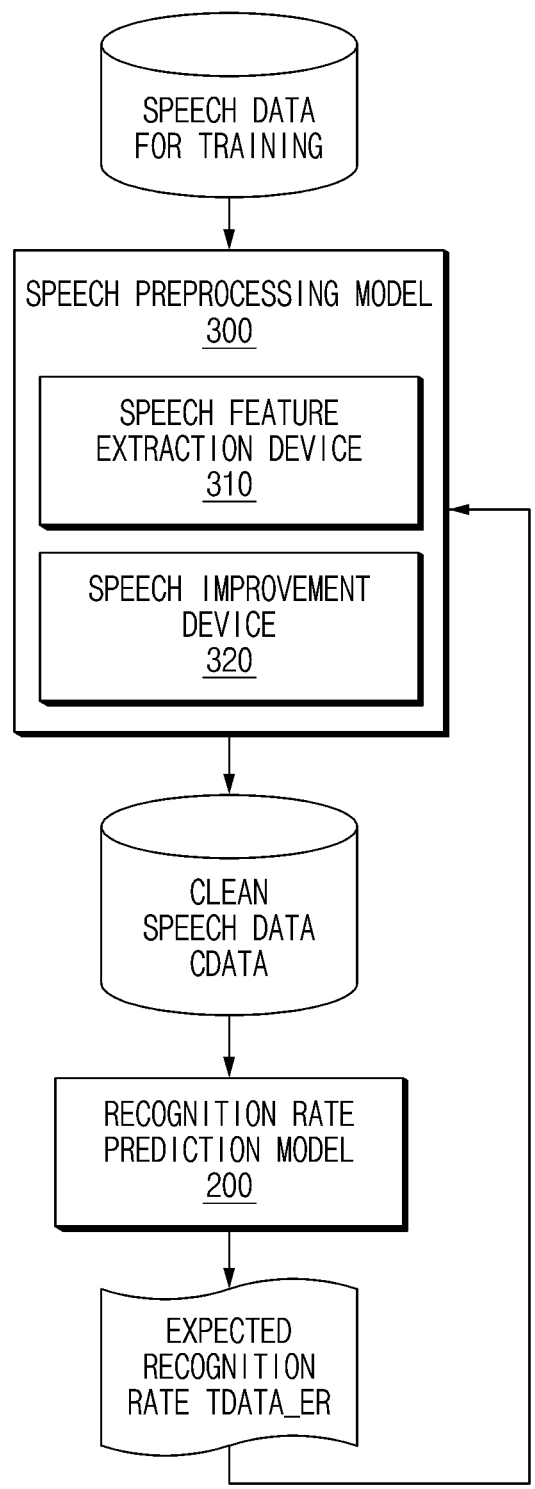
FIG. 8 is a drawing describing a method for updating a speech preprocessing model.

FIG. 8 is a drawing describing a method for updating a speech preprocessing model. FIG. 8 may correspond to a detailed embodiment of a preprocessing model building method shown in FIG. 2.

Referring to FIG. 8, a speech preprocessing model 300 may receive speech data TData for training and may obtain clean speech data CData in which noise is removed from the speech data TData for training. To this end, the speech preprocessing model 300 may include a second speech feature extraction device 310 and a speech improvement device 320.

The second speech feature extraction device 310 may extract a speech feature from a speech signal. The second speech feature extraction device 310 may extract a speech feature from an acoustic signal based on time energy, frequency energy, or linear predictive coding (LPC). Alternatively, the second speech feature extraction device 310 may extract a speech feature based on a Mel frequency cepstral coefficient (MFCC). Alternatively, the second speech feature extraction device 310 may extract a speech feature using a neural network-based embedding vector.

The speech improvement device 320 may improve the quality of the extracted speech feature. The speech improvement device 320 may use at least one of a normalization layer, a convolution layer, a recurrent neural network (RNN), or a fully connected layer.

A recognition rate prediction model 200 may receive clean speech data CData and may learn the clean speech data CData. The recognition rate prediction model 200 may estimate an expected recognition rate CData_ER for the clean speech data, based on the learned result.

A preprocessing model building system woo of FIG. 1 may calculate a difference between the expected recognition rate CData_ER of the clean speech data CData and a maximum recognition rate to calculate a recognition rate loss loss2. The maximum recognition rate may be obtained by recognizing a clean utterance without an error and may be set to 100%.

The recognition rate loss loss2 may be backpropagated to the speech preprocessing model 300.

The speech preprocessing model 300 may proceed with an update based on the recognition rate loss loss2. The speech preprocessing model 300 may proceed with an update in the direction of minimizing the recognition rate loss loss2.

As described above, the preprocessing model building system 1000 may follow the accuracy of a recognition rate when using the speech recognition function based on the clean speech data CData, without evaluating the speech preprocessing model 300 or proceeding with the update of the speech preprocessing model 300 based on a degree to which noise is removed. Because of following a recognition rate of a target speech recognition model in which the speech recognition service is performed, the recognition rate prediction model 200 may increase a speech recognition rate of the target speech recognition model.

The procedure of updating the speech preprocessing model 300 shown in FIG. 8 may be performed in a state where the recognition rate prediction model does not proceed with an update.

The preprocessing model building system for the speech recognition function and the preprocessing model building method therefor according to an embodiment of the present disclosure may be applied to various speech recognition models by updating a speech preprocessing model to follow an expected speech recognition rate of a well-known target speech recognition model.

Furthermore, the preprocessing model building system for the speech recognition function and the preprocessing model building method therefor according to an embodiment of the present disclosure may more increase a speech recognition rate than performing speech preprocessing based on a listening level of the user by updating a speech preprocessing model with a trend that may increase a speech recognition rate of the target speech recognition model which learns clean speech data.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A system comprising:
a training data preparation device configured to obtain a speech recognition rate of speech data for training using a target speech recognition model;
a recognition rate prediction model configured to estimate an expected recognition rate of the target speech recognition model for clean speech data from the speech data for training, wherein the clean speech data are distinct from a reference utterance used as ground truth, wherein the recognition rate prediction model is updatable to increase an expected speech recognition rate; and
a speech preprocessing model configured to:
learn a speech feature on the speech data for training based on artificial intelligence to improve the learned speech feature, preprocess the speech data for training to obtain the clean speech data; and
update the speech preprocessing model based on a recognition rate loss corresponding to a difference between the expected recognition rate and a maximum recognition rate,
wherein the training data preparation device is configured to mix noise and room impulse response information with the reference utterance in which there is no noise to generate the speech data for training.

2. The system of claim 1, wherein the training data preparation device is configured to generate a plurality of pieces of the speech data for training, the plurality of pieces of the speech data corresponding to a plurality of spaces.

3. The system of claim 1, wherein the training data preparation device is configured to calculate a difference between a learning result where the target speech recognition model learns the speech data for training and the reference utterance to obtain the speech recognition rate for training.

4. The system of claim 3, wherein the recognition rate prediction model is configured to:
calculate the expected speech recognition rate of the target speech recognition model based on learning the speech data for training, and
update the recognition rate prediction model based on the speech recognition rate for training for the target speech recognition model.

5. The system of claim 4, wherein the recognition rate prediction model is configured to:
calculate a difference between the expected speech recognition rate of the speech data for training and the speech recognition rate for training to obtain a recognition rate deviation, the speech recognition rate being obtained using the target speech recognition model, and perform an update based on the recognition rate deviation.

6. The system of claim 5, wherein the recognition rate prediction model is configured to perform the update by reducing the recognition rate deviation.

7. The system of claim 4, wherein the speech preprocessing model is configured to perform an update in a state where the update of the recognition rate prediction model does not proceed.

8. The system of claim 1, wherein the speech preprocessing model is configured to:
learn a speech feature of the speech data for training based on artificial intelligence; and
improve the learned speech feature to obtain the clean speech data.

9. The system of claim 1, wherein the speech preprocessing model is configured to perform an update to increase the expected recognition rate in a subsequent preprocessing process.

10. A method performed by a speech recognition system comprising a processor and a memory, the method comprising:
obtaining, by the processor, a speech recognition rate of speech data for training, using a target speech recognition model;
preprocessing, by the processor, the speech data for training using a speech preprocessing model to obtain clean speech data by removing a noise comprises learning a speech feature on the speech data for training based on artificial intelligence to improve the learned speech feature, wherein the clean speech data is distinct from a reference utterance used as ground truth;
estimating, by the processor, an expected recognition rate of the clean speech data, using a recognition rate prediction model, wherein the recognition rate prediction model is updated to increase an expected speech recognition rate; and
updating, by the processor, the speech preprocessing model based on a recognition rate loss corresponding to a difference between the expected recognition rate and a maximum recognition rate,
wherein obtaining the speech recognition rate, using the target speech recognition model, comprises mixing noise and room impulse response information with the reference utterance in which there is no noise to generate the speech data for training.

11. The method of claim 10, wherein generating the speech data for training comprises generating a plurality of pieces of the speech data for training, the plurality of pieces of the speech data corresponding to a plurality of spaces.

12. The method of claim 10, wherein obtaining the speech recognition rate, using the target speech recognition model, comprises calculating a difference between a learning result where the target speech recognition model learns the speech data for training and the reference utterance to obtain the speech recognition rate for training.

13. The method of claim 12, further comprising:
learning, by the recognition rate prediction model, the speech data for training;
calculating, by the recognition rate prediction model, the expected speech recognition rate for the target speech recognition model; and
updating the recognition rate prediction model based on the speech recognition rate for training for the target speech recognition model.

14. The method of claim 13, wherein updating the recognition rate prediction model comprises:
calculating a difference between the expected speech recognition rate of the speech data for training and the speech recognition rate for training to obtain a recognition rate deviation, the speech recognition rate being obtained using the target speech recognition model; and backpropagating the recognition rate deviation to the recognition rate prediction model.

15. The method of claim 14, wherein updating the recognition rate prediction model is performed by reducing the recognition rate deviation.

16. The method of claim 13, wherein updating the speech preprocessing model is performed in a state where an update of the recognition rate prediction model does not proceed.

17. The method of claim 10, wherein preprocessing the speech data for training using the speech preprocessing model to obtain the clean speech data by removing the noise comprises:
  learning a speech feature of the speech data for training based on artificial intelligence, and
  improving the learned speech feature to obtain the clean speech data.

18. The method of claim 10, wherein updating the speech preprocessing model proceeds to increase the expected recognition rate in a subsequent preprocessing process.

19. An apparatus comprising:
  at least one processor;
  a memory with instructions stored thereon, wherein the instructions include a recognition rate prediction model and a speech preprocessing model, and wherein the instructions, when executed by the at least one processor, enable the apparatus to:
    obtain a speech recognition rate of speech data for training, using a target speech recognition model;
    preprocess the speech data for training using the speech preprocessing model to obtain clean speech data by removing noise comprises learning a speech feature on the speech data for training based on artificial intelligence to improve the learned speech feature, wherein the clean speech data is distinct from a reference utterance used as ground truth;
    estimate an expected recognition rate of the clean speech data, using the recognition rate prediction model, wherein the recognition rate prediction model is updated to increase an expected speech recognition rate; and
    update the speech preprocessing model based on a recognition rate loss corresponding to a difference between the expected recognition rate and a maximum recognition rate,
  wherein obtaining the speech recognition rate, using the target speech recognition model, comprises mixing noise and room impulse response information with the reference utterance in which there is no noise to generate the speech data for training.

* * * * *